(12) United States Patent
Williamson et al.

(10) Patent No.: US 6,836,759 B1
(45) Date of Patent: Dec. 28, 2004

(54) METHOD AND SYSTEM OF HANDLING THE SELECTION OF ALTERNATES FOR RECOGNIZED WORDS

(75) Inventors: Peter H. Williamson, Kirkland, WA (US); Charlton E. Lui, Redmond, WA (US); Dan W. Altman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 453 days.

(21) Appl. No.: 09/644,002

(22) Filed: Aug. 22, 2000

(51) Int. Cl.⁷ ............................................. G10L 15/26
(52) U.S. Cl. ...................................... 704/235; 382/181
(58) Field of Search .............................. 382/181, 186, 382/187, 188; 704/235, 251, 270

(56) References Cited

U.S. PATENT DOCUMENTS

| | | | |
|---|---|---|---|
| 5,594,640 A | * 1/1997 | Capps et al. ................. 707/532 |
| 5,615,285 A | 3/1997 | Beernink | |
| 5,675,665 A | 10/1997 | Lyon | |
| 5,682,439 A | 10/1997 | Beernink et al. | |
| 5,710,916 A | 1/1998 | Barbara et al. | |
| 5,764,799 A | 6/1998 | Hong et al. | |
| 5,812,697 A | 9/1998 | Sakai et al. | |
| 5,828,991 A | 10/1998 | Skiena et al. | |
| 5,855,000 A | * 12/1998 | Waibel et al. ............... 704/235 |
| 5,857,099 A | * 1/1999 | Mitchell et al. ............. 704/235 |
| 5,864,805 A | * 1/1999 | Chen et al. .................. 704/235 |

(List continued on next page.)

FOREIGN PATENT DOCUMENTS

JP          07110845      4/1995

OTHER PUBLICATIONS

Liang et al. "Efficient Algorithms for Segmentation and Recognition of Printed Characters in Document Processing." IEEE Pacific Rim Conf. on Communications, Computers and Signal Processing, vol. 1, May 19, 1993, pp. 240–243.

(List continued on next page.)

*Primary Examiner*—Daniel Abebe
(74) *Attorney, Agent, or Firm*—Law Offices of Albert S. Michalik, PLLC

(57) ABSTRACT

In a computing device that receives handwritten data, a method and system that facilitates the selection of alternates for a hand written word. A mechanism uses rules to select a word for the user based on the operating mode (state) of the system. In a cursor operating mode, a word is selected and the alternates are provided for the word based on the position of on screen cursor relative to the word (within or adjacent the word). If not on a word having alternates, the selection can move to another word that has alternates. If multiple words are selected, (selection mode), the system selects the first word of those selected that has alternates. Menu options to go to the next or previous recognized word may also be placed on the menu for easy navigation among words, and a user can automatically walk through multiple word sets to receive alternates for each word, one-word at a time. Words that the recognizer believes correct to a high actual or relative probability may be skipped over in the automatic process, and the display of words that the recognizer is less confident are correct can be modified. The user can adjust such sensitivity settings for determining the probability of correctness.

37 Claims, 10 Drawing Sheets

U.S. PATENT DOCUMENTS

| | | | |
|---|---|---|---|
| 5,953,451 A | | 9/1999 | Syeda-Mahamood |
| 5,960,447 A | | 9/1999 | Holt et al. |
| 5,995,664 A | | 11/1999 | Shimomura |
| 6,005,973 A | * | 12/1999 | Seybold et al. ............. 382/187 |
| 6,014,460 A | | 1/2000 | Fukushima et al. |
| 6,041,141 A | | 3/2000 | Yamamoto et al. |
| 6,111,985 A | | 8/2000 | Hullender et al. |
| 6,340,967 B1 | * | 1/2002 | Maxted ...................... 345/179 |
| 6,473,517 B1 | | 10/2002 | Tyan et al. |
| 6,493,464 B1 | * | 12/2002 | Hawkins et al. ............ 382/189 |
| 2002/0013795 A1 | | 1/2002 | Dresevie et al. |
| 2002/0049796 A1 | | 4/2002 | Dresevie et al. |

OTHER PUBLICATIONS

Lee et al. "A New Methodology for Gray–Scale Character Segmentation and Recognition." Proc. Of the $3^{rd}$ Int. Conf. on Document Analysis and Recognition, vol. 1, Aug. 14, 1995, pp. 524–527.

Ariki et al. "Segmentation and Recognition of Handwritten Characters Using Subspace Method." Proc. Of the $3^{rd}$ Int. Conf. on Document Analysis and Recognition, vol. 1, Aug. 14, 1995, pp 120–123.

Zhao et al. "New Method for Segmenting Unconstrained Handwritten Numeral String." Proc. Of the $4^{th}$ Int. Conf. on Document Analysis and Recognition, vol. 2, Aug. 18, 1997, pp. 524–527.

Arica et al. "A New Scheme for Off–Line Handwritten Connected Digit Recognition." Proc. KES '98, $2^{nd}$ Int. Conf. on Knowledge–Based Intelligent Electronic Systems, vol. 2, Apr. 21, 1998, pp. 329–335.

Jung et al. Machine Printed Character Segmentation Method Using Side Profiles. Proc. SMC '99, IEE Int. Conf. on Systems, Man, and Cybernetics, vol. 6, Oct. 12, 1999, pp. 863–867.

Senda et al. "Document Image Retrieval System Using Character Candidates Generated by Character Recognition Process." Proc. Of the $2^{nd}$ Int. Conf. on Document Analysis and Recognition, Oct. 20, 1993, pp. 541–546.

Carrano. Data Abstraction and Problem Solving with C++; Walls and Mirrors. The Benjamin/Cummings Publishing Company, Inc,. 1995, pp. 150–163, 175–176, 179–180.

Morita et al. "A Fast and Compact Data Structure of Storing Multi–Attribute Relations Among Words." IEEE In Conf. on Systems, Man and Cybernetics, vol. 3, Oct. 11, 1998, pp. 2791–2796.

\* cited by examiner

METHOD AND SYSTEM OF HANDLING THE SELECTION OF ALTERNATES FOR RECOGNIZED WORDS

FIELD OF THE INVENTION

The present invention relates generally to computer devices, and more particularly computer devices arranged to receive handwritten input.

BACKGROUND OF THE INVENTION

Contemporary computing devices allow users to enter handwritten words (e.g., in cursive handwriting and/or printed handwritten characters) and symbols (e.g., a character in Far East languages). The words and symbols can be used as is, e.g., to function as readable notes and so forth, or can be converted to text for more conventional computer uses. To convert to text, for example, as a user writes strokes representing words or other symbols onto a touch-sensitive computer screen or the like, a handwriting recognizer (e.g., trained with millions of samples, employing a dictionary, context and other rules) is able to convert the handwriting data into dictionary words or symbols. In this manner, users are able to enter textual data without necessarily needing a keyboard.

Contemporary handwriting recognizers are not one hundred percent accurate in recognizing words. Because of this, one type of recognizer returns a list of alternates, ranked according to probability by the recognizer. Via a user interface, systems may provide a list of these alternates, from which the user can select a different word instead of the word the recognizer initially guessed as the one that the user most likely intended.

However, alternates are provided on a per word basis, and many users do not at first recognize this concept. As a result, when a user is seeking alternates for a given word, the user often becomes confused because the alternates provided upon menu selection often do not appear to correspond to the word for which the user wants to select an alternate. In general, selection of alternates has not heretofore been a straightforward or intuitive operation.

SUMMARY OF THE INVENTION

Briefly, the present invention provides a method and system for facilitating the selection of alternates by selecting a word for the user based on the cursor position and/or state of the system. In one embodiment, if the user places the cursor on the screen within a word (or just outside a word) having alternates and requests an alternate selection operation, a mechanism incorporating a set of rules selects that word, prior to bringing up the menu of alternates, based on the cursor location. If multiple words are selected, the system selects the first word of those selected that has an alternate. Menu options to go to the next or previous recognized word may also be placed on the menu for easy navigation among words.

Optional enhancements include enabling a user to automatically walk through multiple word sets to receive alternates therefor, one-word at a time, thereby avoiding the need for individual manual selection of each word. Words that the recognizer believes correct to a high actual probability (or high relative probability) may be skipped over in the automatic process; the user can adjust such sensitivity settings. Another optional enhancement includes modifying the display to reflect words that the recognizer is less confident are correct, (e.g., underlining with wavy colored lines), to emphasize to the user the possibility of incorrect recognition for such lower probability words.

Other advantages will become apparent from the following detailed description when taken in conjunction with the drawings, in which:

DETAILED DESCRIPTION

Exemplary Operating Environment

Figure 1:
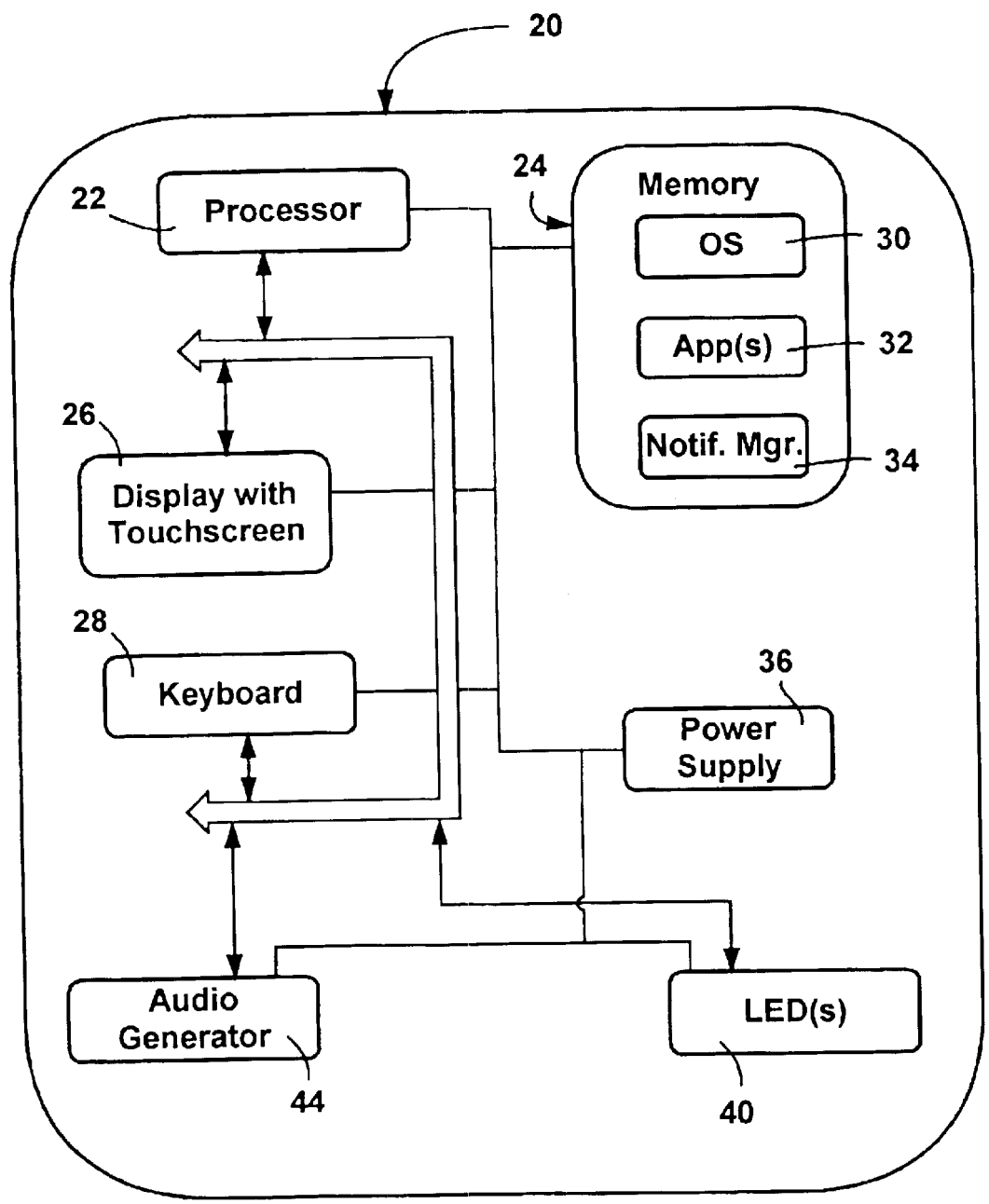
FIG. 1 is a block diagram representing one exemplary computer system into which the present invention may be incorporated.

FIG. 1 illustrates an example of a suitable operating environment 20 in which the invention may be implemented. The operating environment 20 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include routines, programs, objects, components, data structures and so forth that perform particular tasks or implement particular abstract data types. Typically, the functionality of the program modules may be combined or distributed as desired in various embodiments.

Computing device 20 typically includes at least some form of computer-readable media. Computer-readable media can be any available media that can be accessed by the computing device 20. By way of example, and not limitation, computer-readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

FIG. 1 shows functional components of one such handheld computing device 20, including a processor 22, a memory 24, a display 26, and a keyboard 28 (which may be a physical or virtual keyboard). The memory 24 generally includes both volatile memory (e.g., RAM) and non-volatile memory (e.g., ROM, PCMCIA cards, and so forth). An operating system 30 is resident in the memory 24 and executes on the processor 22. The handheld personal computer 20 includes an operating system, such as the Windows® CE operating system from Microsoft® Corporation or other operating system.

One or more application programs 32 are loaded into memory 24 and run on the operating system 30. Examples of applications include email programs, scheduling programs, PIM (personal information management) programs, word processing programs, spreadsheet programs, Internet browser programs, and so forth. The handheld personal computer 20 may also include a notification manager 34 loaded in the memory 24, which executes on the processor 22. The notification manager 34 handles notification requests, e.g., from the application programs 32.

The handheld personal computer 20 has a power supply 36, which is implemented as one or more batteries. The power supply 36 may further include an external power source that overrides or recharges the built-in batteries, such as an AC adapter or a powered docking cradle.

The exemplary handheld personal computer 20 represented in FIG. 1 is shown with three types of external notification mechanisms: one or more light emitting diodes (LEDs) 40, and an audio generator 44. These devices may be directly coupled to the power supply 36 so that when activated, they remain on for a duration dictated by a notification mechanism even though the handheld personal computer processor 22 and other components might shut down to conserve battery power. The LED 40 preferably remains on indefinitely until the user takes action. Note that contemporary versions of the audio generator 44 use too much power for today's handheld personal computer batteries, and so it is configured to turn off when the rest of the system does or at some finite duration after activation.

Selection of Alternates

Figure 2:
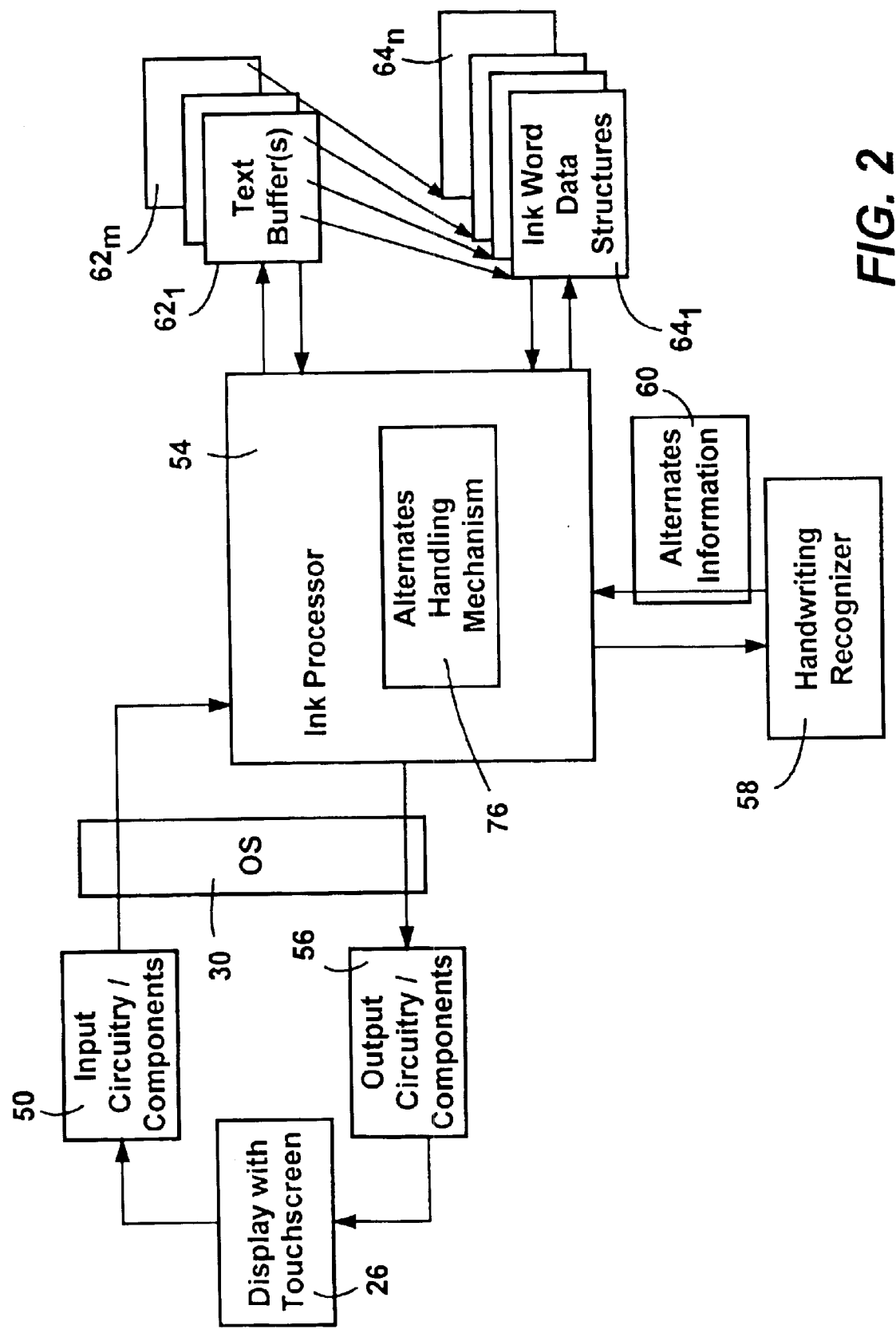
FIG. 2 is a block diagram generally representing components and data structures for handling electronic ink handwritten into a computer system and capable of implementing the present invention.

FIG. 2 represents general components of the computing system 20 when configured for handwriting recognition in accordance with one aspect of the present invention. In FIG. 2, as a user enters data such as by typing or by handwriting data on the touch screen display 26, input circuitry and/or other components 50 pass the information to the operating system 30. Depending on the state of the system and/or where the screen is contacted, the user input may be converted to text by the operating system or treated as handwritten data. For example, when the screen has a representation of a keyboard displayed thereon and that keyboard is touched, the coordinates may be converted to an ASCII or Unicode character, or an editing command, and sent to an appropriate component (e.g. word processor) to use. Alternatively, if the user is writing in a handwriting input area, the input circuitry 50/operating system 32 passes the data to an ink processor component 54 to process and otherwise handle the electronic ink data. Note that a user may enter the handwritten data (electronic ink) in another manner, such as via a tablet connected to a personal computer.

As is understood, the handwritten data may be in the form of coordinates, and may include other information, e.g., pressure data, timing data and so forth. The ink processor component 54 may comprise an application program, or alternatively may be a subcomponent of or integrated into the operating system 30. The ink processor 54 may also be arranged to pass characters, (e.g., Unicode), whether typed or recognized from words or symbols, to conventional applications that can only deal with characters. For purposes of the present description, the ink processing component 54 will also perform the operations of a conventional word processor, e.g., handle both recognized text and unrecognized ink, allow the editing of words, both text words and handwritten words, update the display 26 (e.g., to word-wrap, mark or insert text or words, delete words) as appropriate, and so forth.

After some pre-processing, such as described in related copending U.S. patent application entitled: "Method and System of Matching Ink Processor and Recognizer Word Breaks," U.S. patent application Ser. No. 09/643,417 filed concurrently with and hereby incorporated by reference, the ink processor 54 passes ink data (e.g., one line as entered by a user) corresponding to words or symbols to a recognizer 58 for recognition thereof. The ink processor 54 may also provide ink feature information. Depending on factors such as the system's processing speed and processor/memory availability and so forth, and/or a user's explicit request for recognition, the data passing and/or recognition may take place in the background or foreground, as appropriate. In keeping with the present invention as described below, the recognizer 58 returns alternates information 60 corresponding to recognized word or words for the ink passed thereto. In general, the alternates information 60 comprises a list of alternate word choices, or simply alternates (sometimes referred to as candidates), for each word recognized by the recognizer 58 for a given set of handwriting data passed thereto. The alternates may be ranked in accordance with probability of correctness, and/or probability information associated with each alternate may be returned in the alternates information 60. For example, a list of alternates may be returned with a highest ranked alternate having a sixty percent probability, the next ranked alternate with a ten percent probability, and so on. The number of returned alternates may be limited to some fixed amount, and/or alternates with very low probabilities may be left off the list.

Note that the probability information may be returned on a logarithmic scale instead of in terms of a percentage value. One suitable recognizer is described in U.S. Pat. Nos. 5,313,527 and 5,467,407, hereby incorporated by reference. However, as will be understood, the present invention will operate with any type of recognizer that returns alternates, including a speech recognizer.

As generally represented in FIG. 2, the ink processor 54 maintains one or more text buffers $62_{1-62m}$. Each text buffer (e.g. $62_1$) is a data structure storing some or all of the contents of a document, such as individual letters, spaces, inked words, and drawings. For example, a text buffer can store the entire contents of a document, or each of a plurality of text buffers can represent one paragraph in a document.

To indicate an inked word, the text buffer (e.g., $62_1$) also contains special codes that indicate the locations of ink words $64_1$–$64_n$ relative to text and other items in the text buffer $62_1$. Each such code is directly followed by a pointer to the ink word data structure (sometimes referred to as a scrawl) that contains the ink data for that word.

Figure 3:
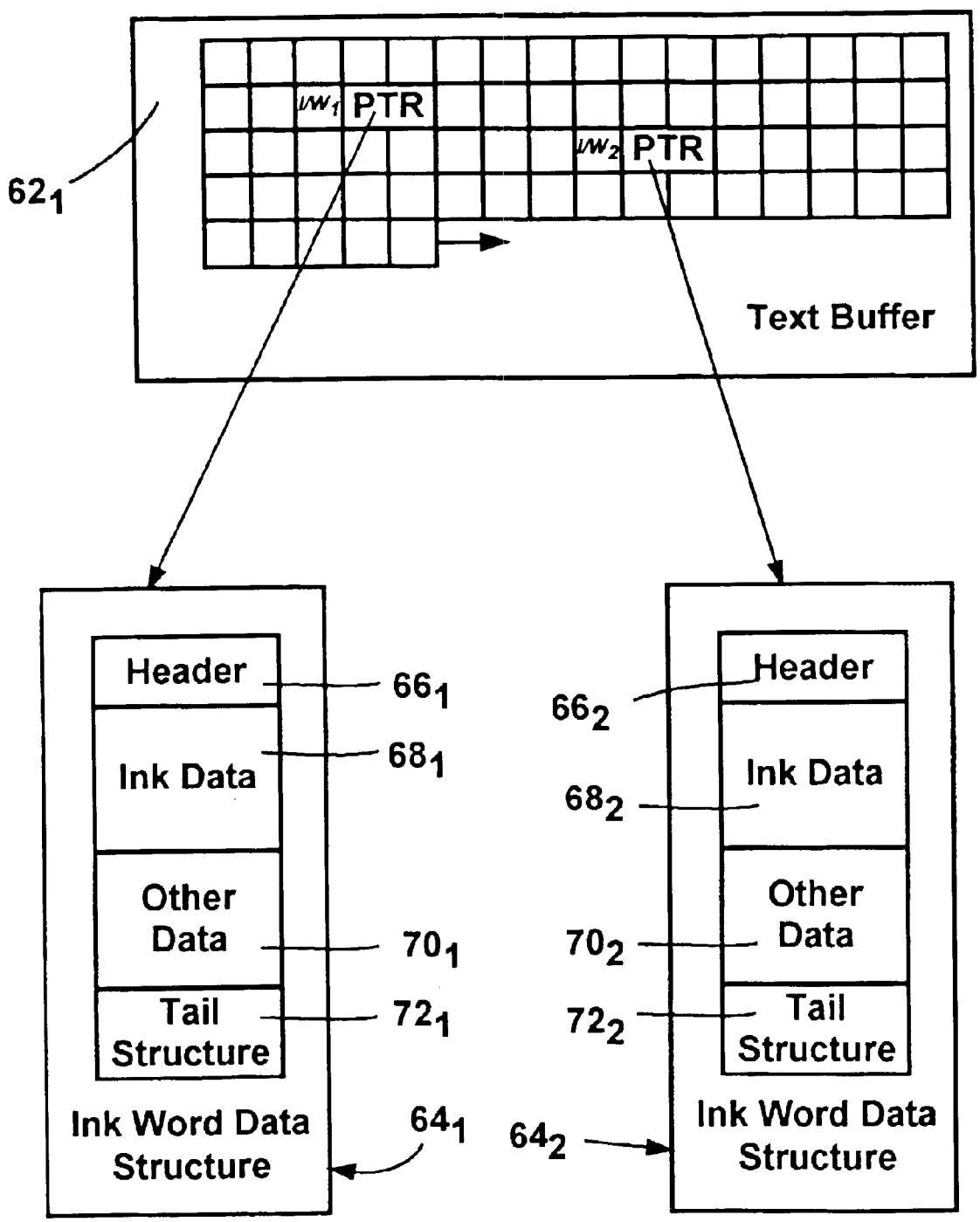
FIG. 3 is a representation of how handwritten data and text data is generally maintained by an ink processor.
Figure 4:
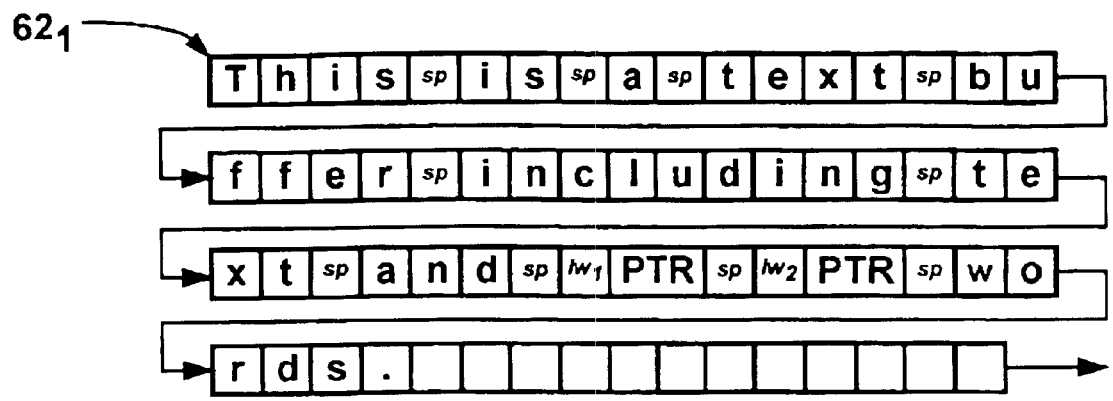
FIG. 4 is a representation of the contents of an example text buffer and how it is displayed to a user.
Figure 4:
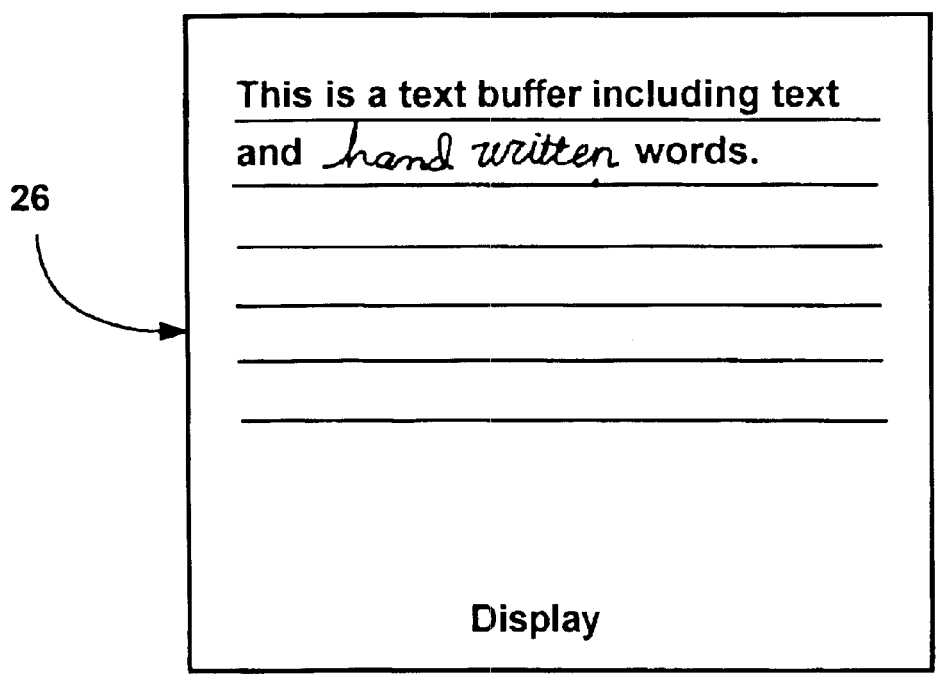

By way of example, FIG. 3 represents a text buffer (e.g., $62_1$) with memory (e.g., bytes) for text, possibly other items, and special ink word codes ($IW_1$ and $IW_2$), each code followed by its respective pointer to ink words $64_1$–$64_2$. As shown in FIG. 3, the pointers are two bytes in length, but of course pointers of other sizes are feasible. FIG. 4 shows how the text buffer $62_1$ (shown in FIG. 4 as a linear array) and its ink word data structures $64_1$–$64_2$ may be interpreted by the ink processor to result in a particular display, prior to the two ink words $64_1$–$64_2$ having been converted to their text form.

As generally represented in FIG. 3, each ink word, such as the ink word $64_1$ is a data structure having a header 66 which describes the ink data section 68 following it. One of the things tracked in the header 66 is whether an ink word has alternates (i.e., the ink was sent to the recognizer with the alternates information returned for it) in a Recognized (tsRecognized) flag. In addition to the header field 66 and ink data field 68, other fields are possible, such as an other data field 70 followed by a tail structure field 72 that describes the other field 70. For example, the other field may include the alternates and probability information associated with those alternates as returned by the recognizer 58 following recognition. The maintenance and use of the alternates, and the tail structure, are described below and further described in related copending U.S. patent applications: Ser. No. 09/643,414 entitled "Method and System for Maintaining Alternated in Association with Recognized Words"; Ser. No. 09/643,617 entitled "Method and System for Searching for Words in Ink Word Documents"; and Ser. No. 09/643,997 entitled "Method and System for Extending Ink Word Data Structures while Maintaining Version Compatibility" filed concurrently herewith and hereby incorporated by reference.

The following table sets forth an ink word data structure (scrawl) including the tail structure:

```
// The Ink Word Structure
typedef struct TXT_SCRAWL
{
    U8          flags;
    U8          candidateChoice;  //index of chosen candidate
                                  //zero based
    INK_STYLE   inkStyle;
    COORD16     width;
    U16         strokeCount;
    U16         bufferSize;
    U8          buffer[2];  //padded for alignment
```

-continued

```
    // first comes the array of strokes
    //then comes a double null terminated list of strings
    //at the very end is a TXT_SCRAWL_TAIL struct
} TXT_SCRAWL, FAR * P_TEXT_SCRAWL;
// this buffer is appended onto the scrawl to optimize
// getting to strings. For compatibility reasons, it grows
// from the beginning, not the end of the tail structure,
// since a negative addressing scheme from the text scrawl
// end is used to get to its members
typedef struct TXT_SCRAWL_TAIL
{
    U32     tailStructVersion;    //starts at 1 and grows
                                  //upwards;
    U32     stringAreaOffset;     //offset from beginning
                                  //of TXT_SCRAWL to the
                                  //start of the double
                                  //null terminated string
                                  //list.
    U32     chosenStringOffset;   //offset from beginning
                                  //of TXT_SCRAWL to the
                                  //chosen string.
    U16     wchFirstXlateChar;    //first char of the
                                  //chosen string.
// ADD ANY NEW MEMBERS AT THE END
} TXT_SCRAWL_TAIL * P_TEXT_SCRAWL_TAIL;
```

For purposes of simplicity herein, the present invention will primarily be described with respect to handwritten cursive words, using the English language for various examples. However, as will be understood, the present invention may operate with printed characters and symbols, and provides numerous benefits regardless of any particular language.

Figure 5:
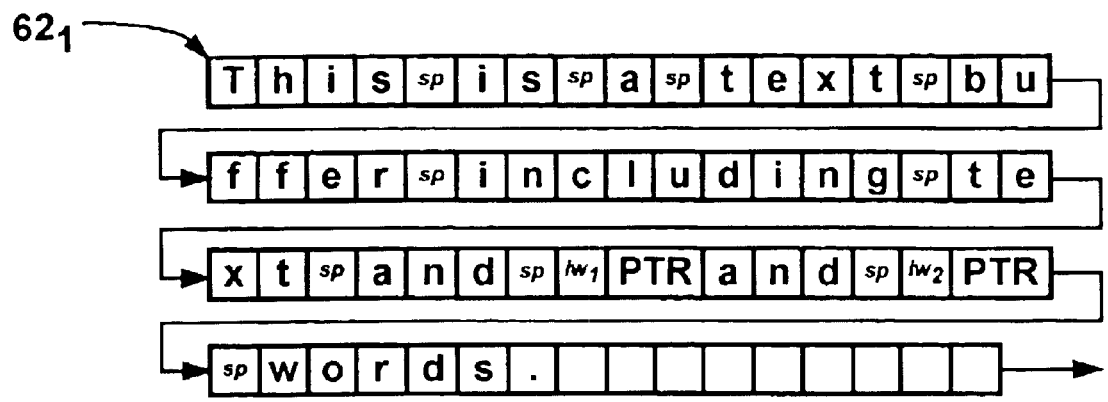
FIG. 5 is a representation of the contents of the example text buffer of FIG. 4 as modified once an ink word has been converted to text.
Figure 5:
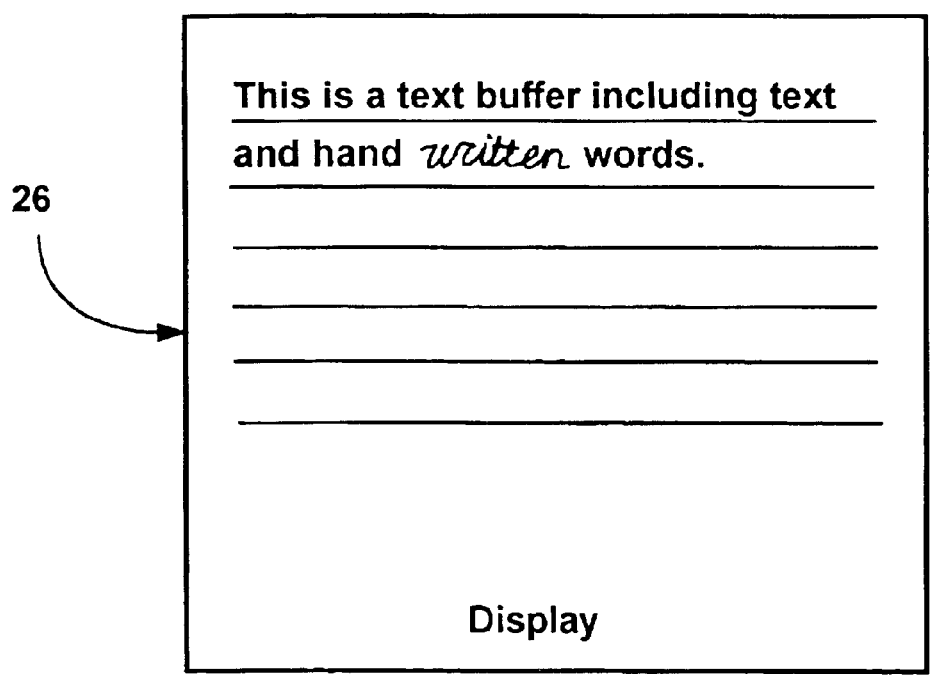

One of the operations performed by the ink word processor 54 is to manage the alternates returned by the recognizer 58. To this end, as generally represented in FIG. 2, the ink processor 54 includes code that serves as an alternates handling mechanism 76. In one general implementation, following recognition of a word, the alternates handling mechanism 76 maintains the alternate information within an ink word data structure of the text buffer. Once a word has an alternate selected, the ink word data structure is displayed as the first letter of the selected alternate, with any remaining letters being inserted as text into the text buffer. Thus, using the example shown in FIG. 4, once an alternate is selected, the ink word storing the data for "hand" will be converted to an ink word that if displayed as text will appear as the letter "h" followed by the text letters "and" in the text buffer, as generally represented in FIG. 5. In this manner, the ink data and alternates are preserved with the word, e.g., as the word is moved around during word processing operations. Note that the initial recognition may occur in the background, without the user's knowledge, e.g., in one implementation, the handwritten ink is still displayed to a user as handwritten until the user affirmatively requests a "Recognize" command (actual recognizer recognition may have already been performed), at which time text will replace the handwritten ink. In this instance, the most probable alternate will be automatically selected and initially displayed to the user, with the user being able to go back and select a different alternate in place of the most probable. As described below, by maintaining the ink data with the word, the user can toggle between ink and text display for such words, and select among the alternates, at least until the user does some action (e.g., saves the document) that makes the conversion to text permanent. Nevertheless, various ways of maintaining alternate information in association with an ink word are feasible, and will work with the present invention. However for purposes of the description herein, the alternates will be described as being stored within the first letter of a recognized word, with the remaining letters being inserted as text into the text buffer following the word.

Figure 6:
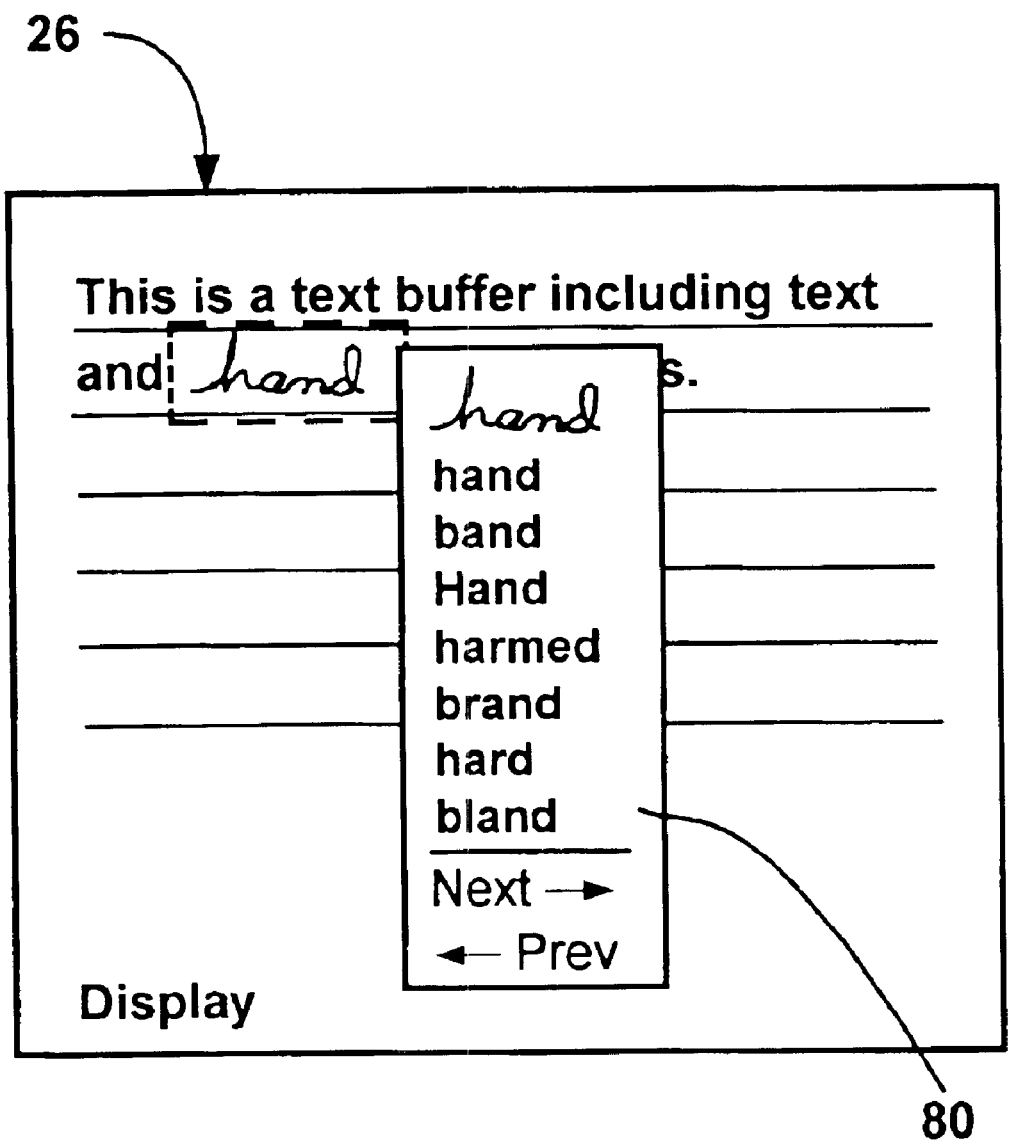
FIG. 6 is a representation of one way in which alternates can be selected for words that have alternates, in accordance with one aspect of the present invention.

FIG. 6 generally represents the alternate information from which a user may select requesting an "Alternates" operation. As described above, the actual recognition may already have taken place in a background operation without the user's knowledge, or the user may have expressly converted handwritten input to text (e.g., in a foreground recognition operation) via a "Tools" menu selection which has a "Recognize" command (or sub-menu) thereunder. The user may then request alternates for the converted words, such as via a "Tools:Alternates" command. Note that it is feasible to have the alternates for a word automatically displayed as part of the foreground recognition operation, e.g., after the words in a document (or some subset thereof) are converted to text by the recognizer, the user may be automatically given alternates for each such word, instead of having the most likely alternate initially selected and displayed for the user. In any event, as described below, the user's action that provides a list of alternates from which to select with be referred to herein as "alternate selection" or the like. However, rather than require the user to separately request alternate selection for each individual word, a system that automatically advances to a next (or optionally previous) word for alternate selection thereof by the user is also described below.

As generally represented in FIG. 6, the user may be presented on the display 26 with a menu list 80 of alternate words from which to select, such as ranked by probability. The user may also be presented with the original ink or some representation thereof, such that the user can go back to the handwritten ink for a word that is presently being displayed as text. Optionally, the user may also be given selections to move the alternate selection to the next or previous word instead of making a selection. Alternative ways of presenting the alternates (e.g., along the bottom of the display 26) are also feasible.

In accordance with one aspect of the present invention, the editing state of the device along with the cursor (caret) position, if present, determines which word will be chosen when a user requests alternate selection. In general, alternate selection occurs on one word at a time, and the present invention (e.g., as implemented in the alternates handling mechanism 76) determines which word this is, and may also may visually indicate to the user which word this is. In this manner, alternates are made available to the user, and at the same time, the user is trained that alternates apply to a single word.

In general, if the user places the cursor on the screen within a word or just outside a word, (cursor mode), that word is selected when the user requests alternate selection (e.g., via the "Tools:Alternates" action). As described above, the selected word may be visibly changed, i.e., selected as "marked" as generally represented by the dashed box around the handwritten word "hand" in FIG. 6, in conjunction with bringing up the alternate selection menu 80. If the word is not an ink word, the process can inform the user that there are no alternates (or even disable the "Tools:Alternates" action in advance), or, as described below, advance to the next ink word, if any. However, as can be readily appreciated, many various ways of handling the enabling/disabling of the menu are possible. For example, the menu may be always enabled, and if nothing is selected, the entire document may be scanned upon invoking the Tools:Alternates" command, possibly also causing any unrecognized words to be sent to the recognizer to convert to text and receive alternates for it.

If a set of one or more words are selected, (selection mode, in contrast to the cursor mode), e.g., by a pen down and drag operation, the system selects the first word having alternates in the set and selects that word. Note that another, more appropriate word could be selected, e.g., depending on the language, however in the English language, selecting the first word makes the most sense. Selecting a single word may include actual selection of the word that deselects the rest of the marked document area, as one benefit of selecting a single word is that it trains the user that alternatives are associated with the single word. However, the user's initial selection information may be preserved so as to enable automatic alternate selection of multiple words, one word at a time, as described below. Note that if a moving selection is not used, then narrowing the selection to a single word will provide feedback to the user that the operation is only valid for single words, and help the user to better use the program in the future.

As in the cursor mode, when in selection mode, if there are no ink words having alternates in the selected area, the process can inform the user that there are no words with alternates as described below, (or alternatively disable the "Tools:Alternates" action in advance). Menu options to go to the next or previously recognized word are optionally placed on the menu 80 for easy navigation. Further, note that if the system is in a state wherein there are no words selected, and no cursor is available, then the alternates feature may be disabled, e.g., the "Tools:Alternates" command is grayed out and deactivated.

Figure 7:
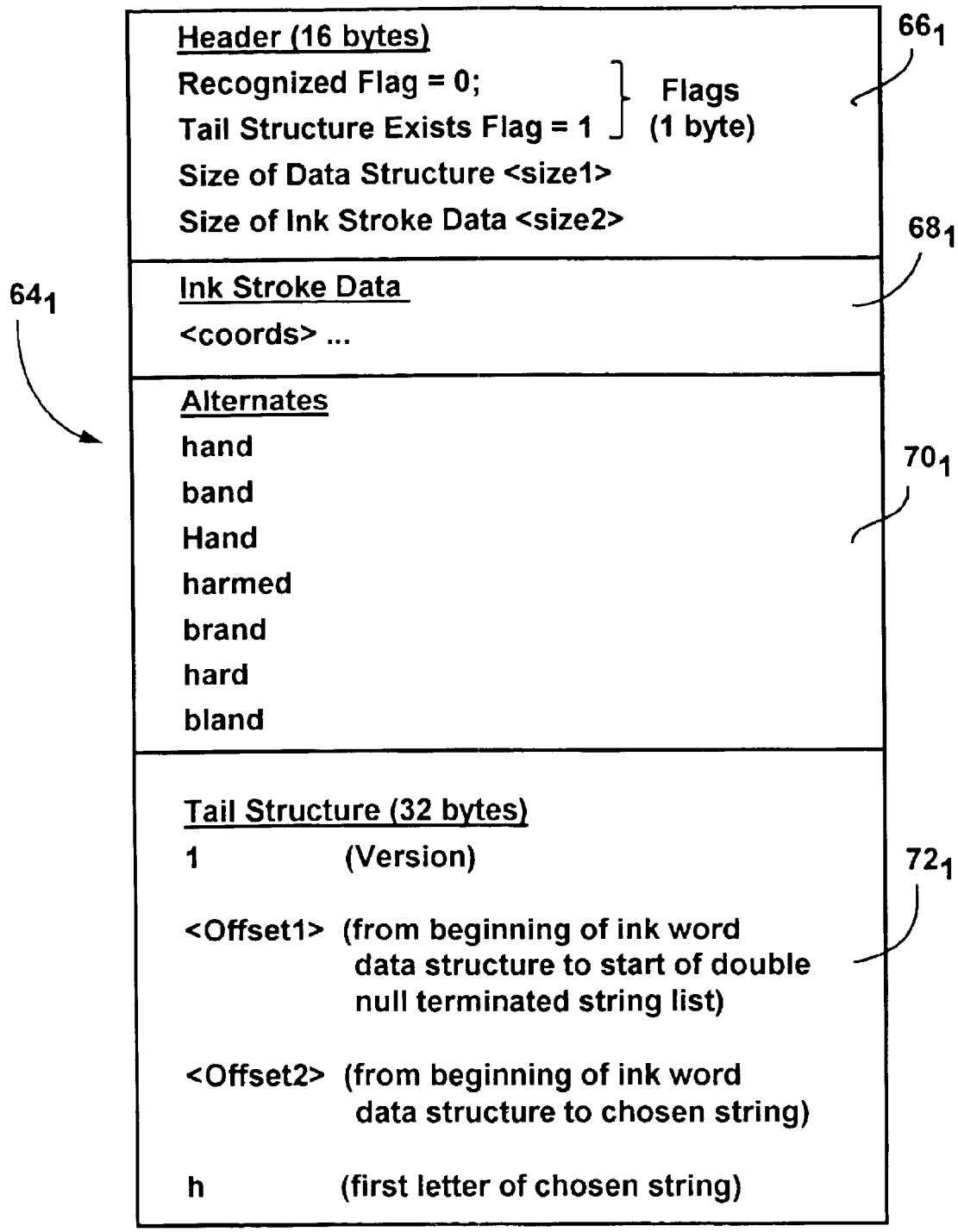
FIG. 7 is a representation of an ink word data structure once alternates have been returned by a recognizer for an ink word.

Once a word is recognized and converted to text, the ink processor 54 displays the ink word data structure differently. To correctly interpret the ink word data structure, as represented in FIG. 7, the alternates handling mechanism 76 works with flags in the header $66_1$ of the ink word data structure $64_1$, the aforementioned Recognized flag (tsRecognized) which indicates whether the recognizer has returned the alternates and stored them in the ink word data structure, and a Show Recognized flag (tsShowRecognized) which indicates whether a user has converted ink to text. The ink processor 54 uses these flags to determine whether it needs to contact the recognizer 58 to obtain alternate information, and also to determine whether to display the ink word as ink or as text. If the word is to be displayed as text, (e.g., Show Recognized flag equals one), only the first character ("h" in the present example, stored in the tail structure $72_1$) of the selected alternate is displayed. As described above with reference to FIG. 5, the succeeding letters of the word ("and" in the present example of the word "hand") are inserted into the text buffer as ordinary text immediately following the ink word. The user may select another alternate as described below, or convert back to an ink word.

Figure 8:
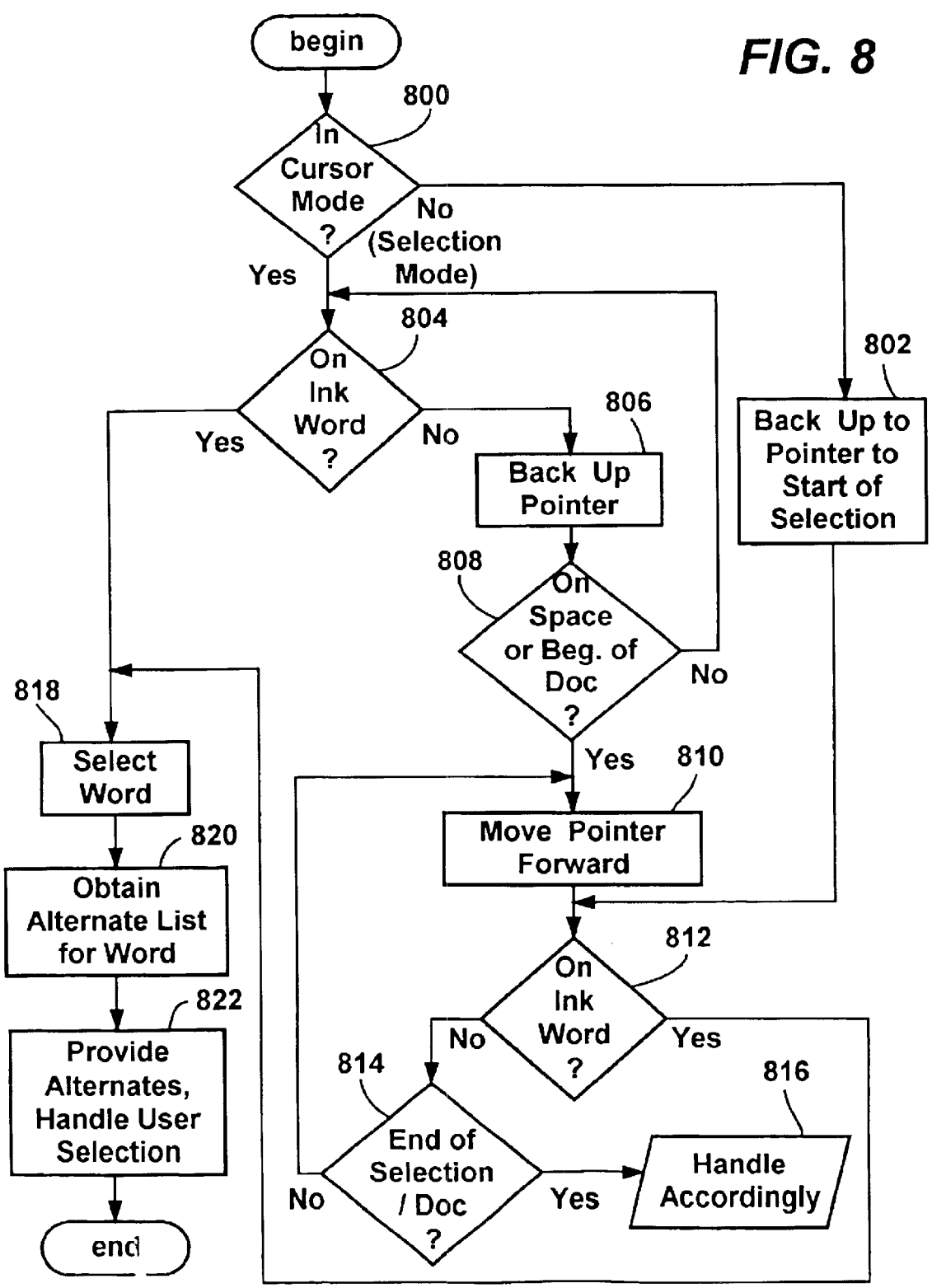
FIG. 8 is a flow diagram generally describing logic implementing rules for determining which word to provide alternates for to a user in accordance with one aspect of the present invention.

Turning to an explanation of the operation of the present invention with particular reference to the flow diagram of FIG. 8, in FIG. 8, a user has requested alternate selection, e.g., via the "Tools:Alternates" command. Note that the steps of FIG. 8 are to show the general logic of how alternate selection, and the present invention may be executed in many different ways. Further, for purposes of simplicity, FIG. 8 assumes that the entire document is in one text buffer, however as will be readily appreciated, it is straightforward to modify the steps described in FIG. 8 to handle a document comprising multiple text buffers (e.g., one per paragraph).

At step 800, the ink processor 54 tests the state that it is in, e.g., whether it is in cursor mode or whether text has been selected (selection mode). If in selection mode, the alternates handling mechanism 76 backs up (e.g., moves an internal pointer in the text buffer 62) to the start of the selected text at step 802, and then advances to step 810 (described below). Note that the mechanism 76 may use the cursor as the internal pointer as desired, and if so, may wish to preserve the cursor position to restore it later, e.g., if the user cancels the alternate selection request.

If instead at step 800 a cursor is present, e.g., the device is in the cursor mode with a caret displayed, step 800 branches to step 804. Step 804 tests whether the caret is on an ink word, i.e., whether the next character in the text buffer 62 indicates an ink word. If so, the process branches ahead to select that word at step 818, as described below. Otherwise, it is possible at step 804 that the user's cursor is within the letters of an ink word that has been converted to text, in which event it has an alternate selected therefor, (possibly the most probable by default). Note that in some implementations it may also be possible to insert a cursor into an ink word prior to having the word displayed as text. In any event, steps 806 and 808 are executed to back up the pointer in the text buffer until it is on an ink word (step 804, described above), or until a space character or the beginning of the document is reached (step 808).

If a space character or the beginning of the document is detected at step 808, then the user's cursor was not within the boundaries of an ink word. In this instance, the pointer is advanced via steps 810, 812 and 814 until an ink word is detected or the end of the document is reached. Note that moving forward is only one way the mechanism can proceed, as the user could instead be prompted, or the search for an ink word can proceed backwards (e.g., by ignoring spaces, and/or by possibly by searching from the end of the document if the beginning of the document is reached). If moving forward, when the end of the document is reached, the user can be informed of this via step 816, and optionally allowed to look for a word with alternates from the start of the document.

If instead the user requesting alternate selection was in the selection mode at step 800, step 802 moves the pointer to the start of the selection, and then the search starts forward. As represented in FIG. 8, the corresponding pointed-to location in the text buffer is tested for an ink word at step 812. In the selection mode, the pointer is advanced via steps 810, 812 and 814 until an ink word is detected or the end of the selection is reached (which may also coincide with the end of the document). If the end of the selection/document is reached, the process may handle accordingly at step 816, for example, to inform the user, and/or allow the user to have the system continue looking, e.g., beyond the selected text when in the selection mode, and/or from the beginning of the document when the selection coincides with the end of the document.

While walking through the text buffer in the above-identified manner, if an ink word is detected via step 804 or step 812, the process branches to step 818. At step 818, the ink word is selected to visually show the user that a single word is having the menu 80 of alternates provided for it. Note that the ink word may be currently being displayed as handwritten ink, or as text if it previously had an alternate chosen for it. If text, the ink word data structure tells the alternates handling mechanism 76 the first character to display and also the number of characters that belong to the ink word and follow it in the text buffer.

Step 820 represents the obtaining of the alternates, e.g., from the ink word. As determined via the Recognized flag in the ink word data structure, the selected word may or may not have alternates, e.g., by background recognition. Thus although not separately shown in FIG. 8 for purposes of simplicity, as part of step 820, the recognizer 58 may be provided with ink data including the selected word in order to convert the word to text including getting the alternates and storing them in the ink word data structure as generally described above.

Lastly, step 822 represents the providing of the alternates (e.g., menu 80) to the user and the handling of the user selection. If the user selects the ink, then the ink is put back if necessary, e.g., when text was displayed for the word, the Show Recognized flag is cleared so that ink will be displayed, and any trailing characters in the text buffer deleted. If the user selects a text word, then the Show Recognized flag in the header of the data structure is set, and the characters following the first character are inserted into the text buffer. If a text word is already present and the user selects a different alternate, then the data structure needs to adjust the offset in the tail structure for the word currently selected, and manipulate the text following the ink word as needed, e.g., replace, insert or delete letters following the ink word in the text buffer. Note that if the user selects the same text word as one that is already selected, this need not occur. The manipulation of the text buffer 62 and the ink word data structure 64 when the user selects an alternate is described in more detail in the aforementioned U.S. patent applications entitled: "Method and System for Maintaining Alternates in Association with Recognized Words" and "Method and System for Extending Ink Word Data Structures While Maintaining Version Compatibility." The display may then be updated.

Figure 9:
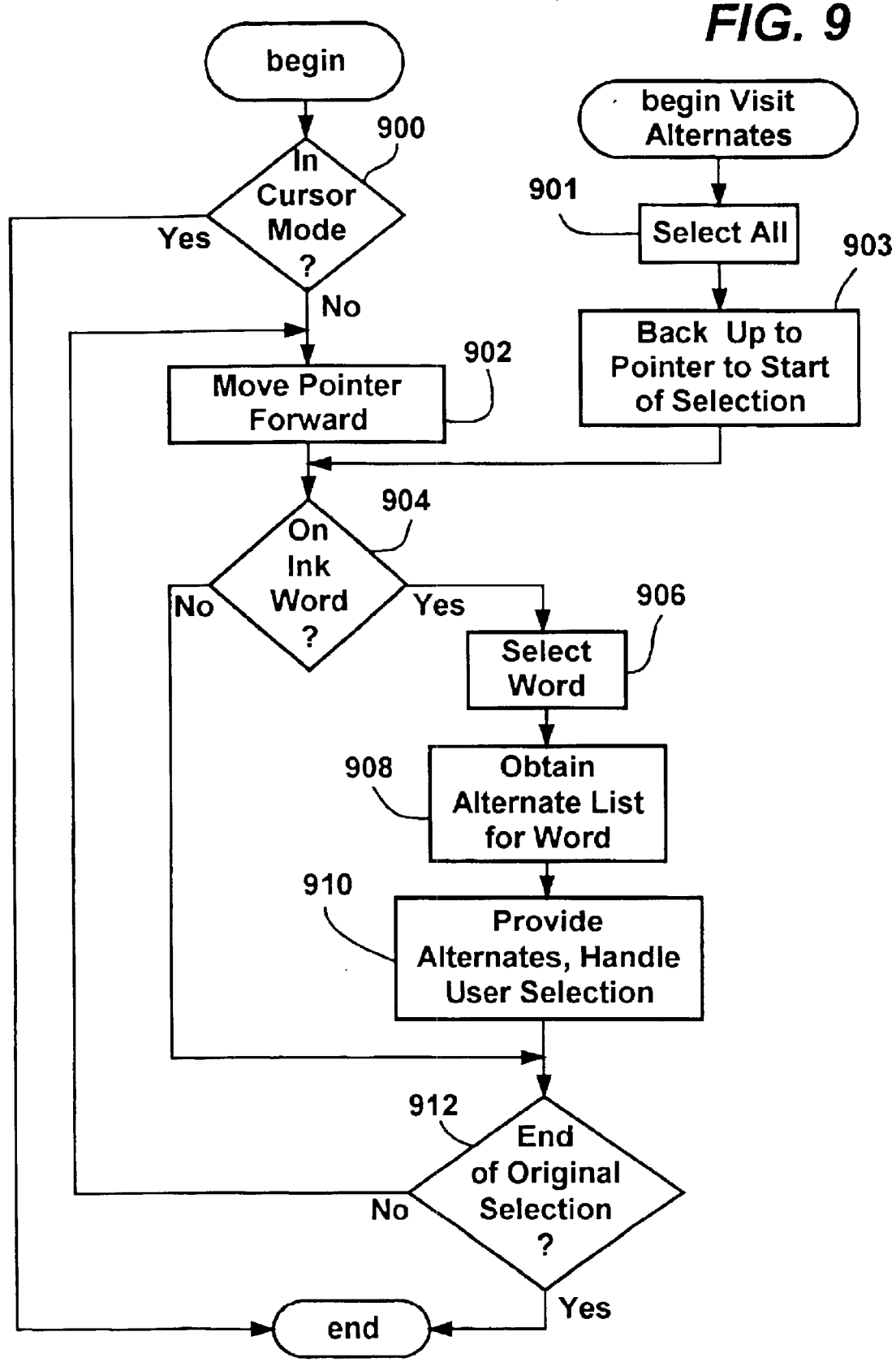
FIG. 9 is a flow diagram generally describing logic for handling alternate selection for multiple words in accordance with another aspect of the present invention.

FIG. 9 shows an automated process that automatically advances to the next ink word for a selection of text and/or ink words. FIG. 9 can logically follow the end of FIG. 8, for example, by ending if in cursor mode via step 900 or continuing by moving forward (step 902), or can be independently run following an "Visit Alternates" command or the like, that for example, selects the entire document (step 901, possibly not marking it as selected so as to not confuse the user), moves the pointer to the start of the selected text (step 903), and then starts at step 904 as represented in FIG. 9. As can be readily appreciated, instead of actually first selecting the entire document, such a command can simply keep moving in one direction to provide the menu of alternates for each appropriate word, one at a time, until the entire document is traversed or some suitable ending point is reached.

Step 904 tests whether the pointer is on an ink word. If not, the pointer is advanced via steps 912 and 902 until an ink word is detected at step 904 in the next loop or the end of the selection is reached at step 912 (which may also coincide with the end of the document). If an ink word is detected, steps 906, 908 and 910 operate as described above with respect to steps 818, 820 and 822 of FIG. 8, i.e., to select the word, obtain its alternates, provide them to the user for selection of an alternate, and then adjust as necessary for the selection. Step 912 continues the process until the end of the selection is reached, thereby enabling a user to automatically select alternates for a plurality of ink words.

Figure 10:
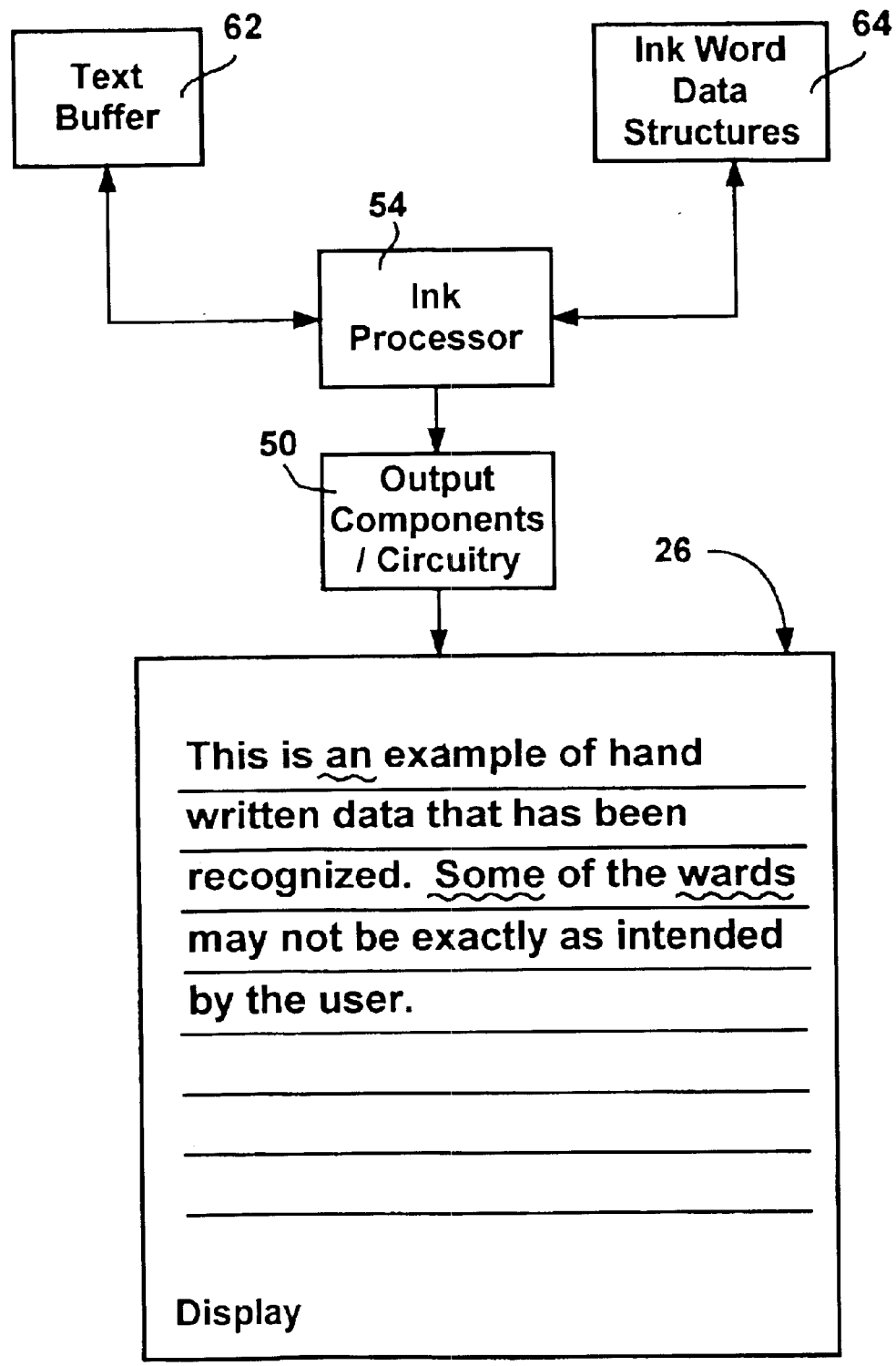
FIG. 10 is a representation of one way in which at least some words having alternates may be presented to a user.

Lastly, FIG. 10 represents one way in which words having alternates may be displayed to a user, by underlining (e.g., wavy, possibly colored lines) or otherwise highlighting words that have alternates. The user can toggle such a feature on or off. Moreover, through a slider bar or the like, the user can adjust a sensitivity to determine when a word should be considered as having an alternate. For example, a user could set a threshold probability so as to only specially treat words as having alternates when the most likely word is below a certain percentage probability. Alternatively, or in addition to a threshold, a difference in the most likely to next most likely word can be used, e.g., ninety-five percent certainty indicates that a word should be treated as not having alternates, or eighty percent if the next most probable word is less than ten percent (a seventy percent difference). Note that such probabilities can be used both in displaying differently (FIG. 10) or when automatically searching through a plurality of selected words to determine which ones have alternates, as described above. For example, the flow diagrams can be adjusted to evaluate probability information before determining whether an ink word should be treated as such. In the example of FIG. 9, the system could thus jump from "Some" to "wards" during alternate selection, even though "of" and "the" may each have alternates. Further, it is feasible to have the system automatically select highly probable words as the alternates information is returned by the recognizer, (e.g., in response to foreground recognition), but provide a menu of alternates for words that are less certain. Also, when the user requests conversion to text, a word with a most-probable choice that achieves some probability level of certainty can be considered recognized and selected, with the other information discarded.

As can be seen from the foregoing detailed description, there is provided a method and system that implements rules to select which word to provide alternates for to a user; and train the user as to the per-word nature of alternate selection. The method and system are fast, efficient and can be automated over multiple word sets, and can also utilize probability information when determining which word to select.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing device, a method comprising:
   receiving a request to provide alternates for a word that has alternates and that is within a set of words containing at least two words that have alternates, when no particular word that has alternates has been selected in the set;
   determining a current editing mode in which the computing device is operating with respect to receiving input into the device;
   selecting a word in the set that has alternates as a selected word based on the current editing mode;
   utilizing probability information to determine whether a word in the set that has alternates associated therewith will be considered as having alternates for purposes of providing alternates therefore; and
   providing alternates for the selected word.

2. The method of claim 1, wherein the current editing mode comprises a cursor mode, and wherein selecting the word comprises locating a word relative to a cursor position.

3. The method of claim 2, wherein locating the word relative to the cursor position comprises determining if the cursor position is adjacent a word having alternates associated therewith.

4. The method of claim 2, wherein locating the word relative to the cursor position comprises moving to another word having alternates associated therewith.

5. The method of claim 2, wherein locating the word relative to the cursor position comprises determining if a cursor that indicates the cursor position is placed on a word having alternates associated therewith.

6. The method of claim 5, wherein determining if the cursor is placed on a word having alternates associated therewith comprises moving a pointer to the beginning of the word.

7. The method of claim 1, wherein the current editing mode comprises a selection mode, wherein the set is determined via a selection operation and the set contains at least two words that each has its own alternates associated therewith, and wherein selecting the word based on the current editing mode comprises selecting a first word in the set that has alternates associated therewith.

8. The method of claim 1 further comprising, receiving an alternate choice.

9. The method of claim 1 further comprising moving to another word in the set that has alternates associated therewith.

10. The method of claim 1, wherein providing alternates for the selected word includes providing a user interface.

11. The method of claim 10, wherein the user interface provides an option to select a next word of the set that has alternates associated therewith.

12. The method of claim 10, wherein the user interface provides an option to select a previous word of the set that has alternates associated therewith.

13. The method of claim 10, wherein the user interface provides an option to select a next word of the set that has alternates associated therewith, and further comprising, detecting a request to select the next word that has alternates associated therewith.

14. The method of claim 1 wherein the user provides data corresponding to a sensitivity level for determining from the probability information whether a word will be considered as having alternates associated therewith.

15. The method of claim 1 father comprising, displaying at least part of the set, and modifying the display of each displayed word in the set having alternates associated therewith.

16. The method of claim 15 further comprising, utilizing probability information to determine whether a word in the set that has alternates associated therewith will be considered as having alternates associated therewith for purposes of modifying the display.

17. The method of claim 16 wherein the user provides data corresponding to a sensitivity level for determining from the probability information whether a word will be considered as having alternates associated therewith.

18. A computer-readable medium having computer-executable instructions, comprising:
   providing a mechanism for enabling a user to request alternates for words that have alternates associated therewith;
   receiving a request to provide the alternates for a word within a plurality of words that have alternates associated therewith, when no particular word of the plurality is identified as being the word for which the alternates are requested;
   determining for which one word of the plurality of words the alternates should be provide, including analyzing probability information associated with at least some the alternates; and
   providing the alternates for the one word.

19. The computer-readable medium of claim 18 wherein determining for which one of the plurality of words the alternates should be provided includes determining a current editing mode.

20. The computer-readable medium of claim 19 wherein the current editing mode comprises a cursor mode, and wherein determining for which one of the plurality of words the alternates should be provided includes locating the one word based on a cursor position.

21. The computer-readable medium of claim 19 wherein the current editing mode comprises a selection mode, and wherein determining for which one of the plurality of words the alternates should be provided includes locating the word based on a starting point of a selection.

22. The computer-readable medium of claim 21 wherein locating the word based on the starting point of the selection includes locating within the selection the first word having alternates following the starting point of the selection.

23. The computer-readable medium of claim 18 further comprising modifying a display to visually indicate each word within the plurality that has at least one alternate associated therewith.

24. The computer-readable medium of claim 18 further comprising, modifying a display to visually indicate a word within the plurality that does not have an alternate associated therewith that is above a level of recognition certainty.

25. The computer-readable medium of claim 24 wherein the level of recognition certainty is user-settable.

26. The computer-readable medium of claim 24 wherein the level of recognition certainty comprises an absolute probability level of at least one alternate.

27. The computer-readable medium of claim 24 wherein the level of recognition certainty comprises a relative probability level of at least two alternate.

28. The computer-readable medium of claim 18 further comprising, receiving a user selection of an alternate.

29. The computer-readable medium of claim 18 further comprising, determining that other alternates should be provided for another word of the plurality of words, and providing the other alternates for the other word.

30. The computer-readable medium of claim 29 wherein determining that the other alternates should be provided for the other word comprises receiving a navigation command.

31. The computer-readable medium of claim 18 further comprising, receiving a user selection of an alternate, determining that other alternates should be provided for another word of the plurality of words, and providing the other alternates for the other word.

32. In a computing device, a method comprising:

receiving a request to provide alternates for a word that has alternates and that is within a set of words containing at least two words that have alternates, when no particular word that has alternates has been selected in the set;

determining a current editing mode in which the computing device is operating with respect to receiving input into the device;

selecting a word in the set that has alternates as a selected word based on the current editing mode;

providing alternates for the selected word;

displaying at least part of the set;

utilizing probability information to determine whether a word in the set that has alternates associated therewith will be considered as having alternates associated therewith for purposes of modifying the display; and modifying the display of each displayed word in the set having alternates associated therewith.

33. The method of claim 32 wherein the user provides data corresponding to a sensitivity level for determining from the probability information whether a word will be considered as having alternates associated therewith.

34. A computer-readable medium having computer-executable instructions, comprising:

providing a mechanism for enabling a user to request alternates for words that have alternates associated therewith;

receiving a request to provide the alternates for a word within a plurality of words that have alternates associated therewith, when no particular word of the plurality is identified as being the word for which the alternates are requested;

determining for which one word of the plurality of words the alternates should be provided; and providing the alternates for the one word; and modifying a display to visually indicate a word within the plurality that does not have an alternate associated therewith that is above a level of recognition certainty.

35. The computer-readable medium of claim 34 wherein the level of recognition certainty is user-settable.

36. The computer-readable medium of claim 34 wherein the level of recognition certainty comprises an absolute probability level of at least one alternate.

37. The computer-readable medium of claim 34 wherein the level of recognition certainty comprises a relative probability level of at least two alternates.

* * * * *